United States Patent
Mishra et al.

(10) Patent No.: US 8,489,232 B2
(45) Date of Patent: Jul. 16, 2013

(54) SYSTEMS AND METHODS FOR RECEIVING SHIPMENT PARCELS

(75) Inventors: Devesh Mishra, Snoqualmie, WA (US); Eric C. Young, Mercer Island, WA (US); Sameer Vinod Shah, Seattle, WA (US); Timothy Jesse Tien, Seattle, WA (US); Jun Zhao, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 1009 days.

(21) Appl. No.: 12/329,927

(22) Filed: Dec. 8, 2008

(65) Prior Publication Data

US 2010/0082152 A1    Apr. 1, 2010

Related U.S. Application Data

(63) Continuation-in-part of application No. 12/241,475, filed on Sep. 30, 2008.

(51) Int. Cl.
*G06F 7/00* (2006.01)

(52) U.S. Cl.
USPC ....... 700/230; 235/384; 235/454; 235/462.42

(58) Field of Classification Search
USPC .................................. 700/213, 225, 226, 230
See application file for complete search history.

(56) References Cited

U.S. PATENT DOCUMENTS

| | | | | |
|---|---|---|---|---|
| 4,630,051 A | * | 12/1986 | Adams et al. | 342/133 |
| 5,838,759 A | * | 11/1998 | Armistead | 378/57 |
| 5,841,881 A | * | 11/1998 | Iwakawa et al. | 382/101 |
| 6,400,845 B1 | * | 6/2002 | Volino | 382/176 |
| 6,517,004 B2 | * | 2/2003 | Good et al. | 235/472.02 |
| 6,959,108 B1 | * | 10/2005 | Bartelt et al. | 382/141 |
| 7,085,677 B1 | | 8/2006 | Champlin et al. | |
| 2002/0071522 A1 | * | 6/2002 | Fenkart et al. | 378/147 |
| 2002/0176534 A1 | * | 11/2002 | Meder | 378/57 |
| 2003/0038179 A1 | * | 2/2003 | Tsikos et al. | 235/454 |
| 2003/0109954 A1 | * | 6/2003 | Daniels et al. | 700/226 |
| 2005/0199722 A1 | * | 9/2005 | Borja | 235/462.01 |

(Continued)

OTHER PUBLICATIONS

International Search Report and Written Opinion mailed Nov. 9, 2010.

(Continued)

*Primary Examiner* — Gene Crawford
*Assistant Examiner* — Kyle Logan
(74) *Attorney, Agent, or Firm* — Thomas Horstemeyer, LLP

(57) ABSTRACT

Disclosed are various embodiments of systems and methods for receiving shipment parcels at materials handling facilities. A parcel receiving system has an imaging tunnel through which shipment parcels received at a materials handling facility are passed. While a shipment parcel is passing through the imaging tunnel, a camera captures at least one image of the parcel. The parcel image is electronically analyzed to discover various tracking information and to detect various types of exceptions, such as damage to the parcel or defective tracking information. In addition, the captured image is stored in order to create a visual record of the parcel at the time of reception. This record may be used in a variety of ways, such as resolving or tracking exceptions or providing feedback to the vendor or shipment carrier. In addition, the parcel image may be viewed by a user to enable the user to detect and/or resolve an exception. Thus, the overall process of receiving parcels is facilitated, and the percentage of parcels diverted to an exception bin may be decreased.

25 Claims, 8 Drawing Sheets

U.S. PATENT DOCUMENTS

| | | |
|---|---|---|
| 2006/0007304 A1 | 1/2006 | Anderson |
| 2006/0086794 A1* | 4/2006 | Knowles et al. ............. 235/454 |
| 2006/0231209 A1 | 10/2006 | Smith |
| 2007/0012602 A1 | 1/2007 | Baldassari et al. |
| 2007/0041612 A1 | 2/2007 | Perron et al. |
| 2007/0080228 A1* | 4/2007 | Knowles et al. ......... 235/462.42 |
| 2007/0158417 A1* | 7/2007 | Brewington ................. 235/383 |
| 2007/0215706 A1* | 9/2007 | Kotlarsky et al. ........ 235/462.07 |
| 2008/0121689 A1 | 5/2008 | Good et al. |
| 2008/0173710 A1* | 7/2008 | Skaaksrud et al. ............ 235/384 |

OTHER PUBLICATIONS

European Search Report, dated Apr. 3, 2012.

* cited by examiner

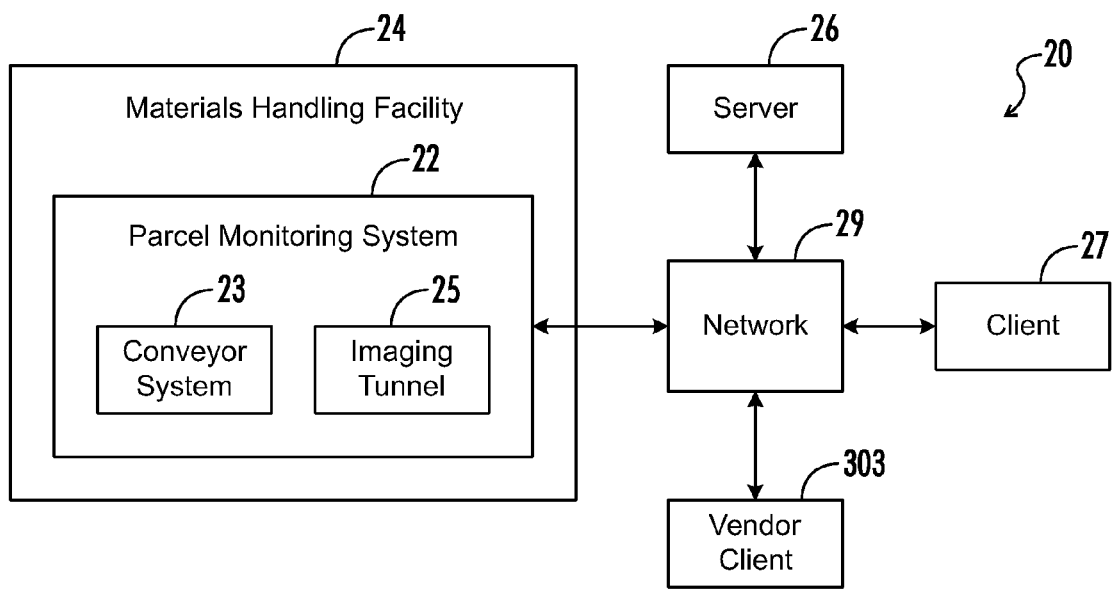
FIG. 1
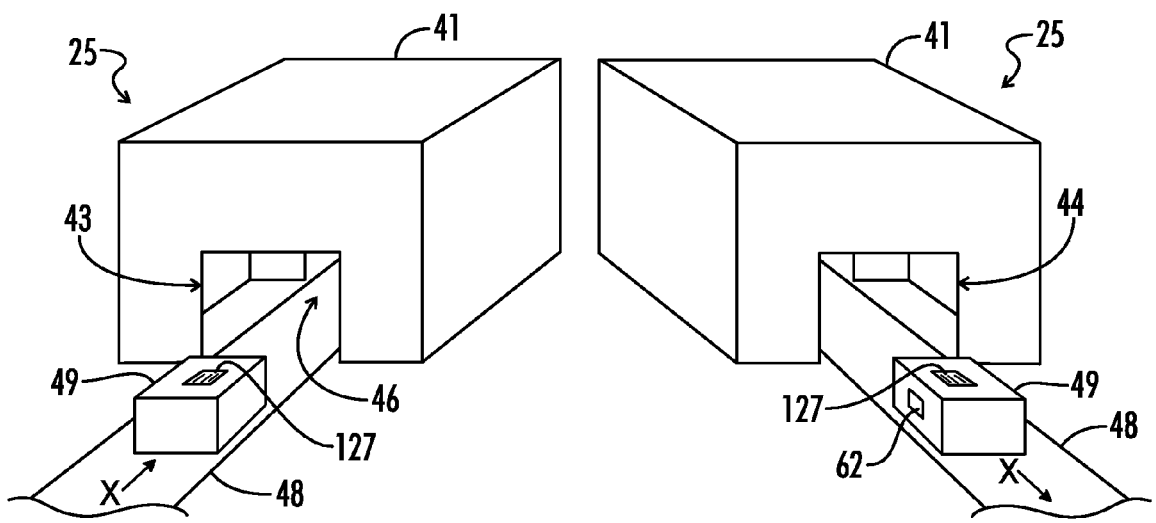
FIG. 2
FIG. 3

SYSTEMS AND METHODS FOR RECEIVING SHIPMENT PARCELS

CROSS REFERENCE TO RELATED APPLICATION

This application is a continuation-in-part of commonly-assigned U.S. patent application Ser. No. 12/241,475, entitled "Systems and Methods for Receiving Shipment Parcels," and filed on Sep. 30, 2008, which is incorporated herein by reference.

BACKGROUND

Some materials handling facilities, such as product distribution or fulfillment centers, process a large amount of inventory, and there can be significant burdens and costs associated with receiving shipment parcels at such a facility. In this regard, for each received parcel, a user often enters tracking information, such as a purchase order (PO) number, a shipment carrier identifier, a vendor identifier, and/or other information that is commonly used to track the parcel for delivery or storage at a materials handling facility. However, different vendors and shipment carriers often use different formats, shipment procedures, and tracking information. In addition, exceptions can further complicate the process for receiving shipment parcels at a materials handling facility. An exception generally refers to a parcel defect or anomaly such as a damaged package or product, defective tracking information, such as an inaccurate, missing, or illegible PO or vendor information, or other shipment errors. Ensuring that the appropriate information has been captured for incoming parcels at a materials handling facility and handling exceptions for such parcels can be extremely burdensome and expensive.

BRIEF DESCRIPTION OF THE DRAWINGS

Many aspects of the disclosure can be better understood with reference to the following drawings. The components of the drawings are not necessarily to scale, emphasis instead being placed upon clearly illustrating the principles of the disclosure. Furthermore, in the drawings, like reference numerals designate corresponding parts throughout the several views.

FIG. 1 is a block diagram illustrating an exemplary embodiment of a parcel receiving system.

FIG. 2 is a diagram illustrating an exemplary embodiment of an imaging tunnel, such as is depicted in FIG. 1.

FIG. 3 is a diagram illustrating the imaging tunnel depicted in FIG. 2.

DETAILED DESCRIPTION

Figure 4:
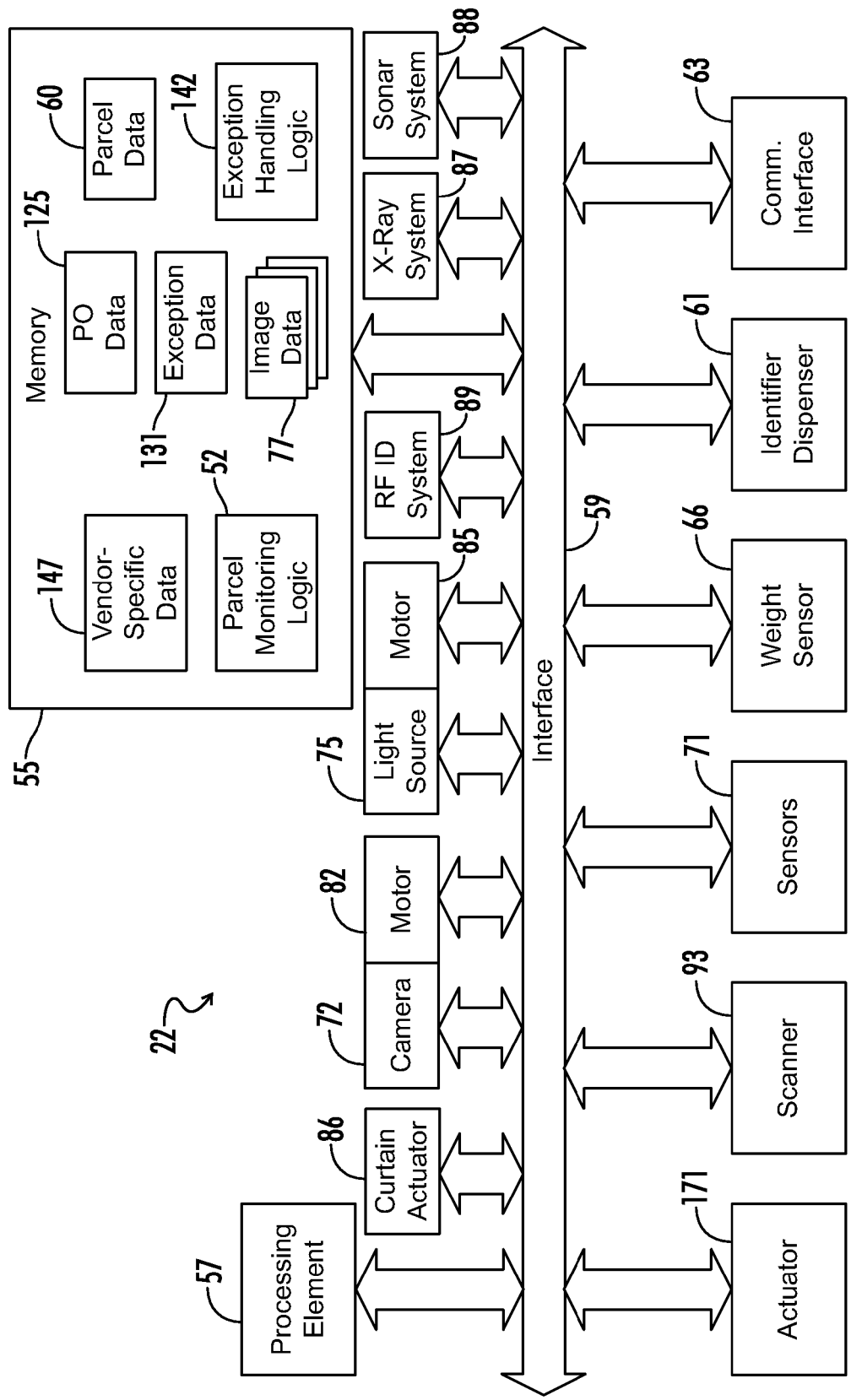
FIG. 4 is a block diagram illustrating an exemplary embodiment of a parcel monitoring system, such as is depicted by FIG. 1.

The present disclosure generally relates to systems and methods for receiving shipment parcels at materials handling facilities. One exemplary embodiment of a parcel receiving system has an imaging tunnel through which shipment parcels received at a materials handling facility are passed. While a shipment parcel is passing through the imaging tunnel, a camera captures at least one image of the parcel. The parcel image is electronically analyzed to discover various tracking information, such as purchase order (PO), shipment carrier, or vendor information. The parcel image is also electronically analyzed to detect various types of exceptions, such as damage to the parcel or defective tracking information. Exceptions may be automatically detected via other techniques, such as sensing the size or weight of the parcel. In addition, the captured image is stored in order to create a visual record of the parcel at the time of reception. This record may be used in a variety of ways, such as resolving or tracking exceptions or providing feedback to the vendor or shipment carrier. Thus, the overall process of receiving parcels is facilitated, and the percentage of parcels diverted to an exception bin may be decreased.

FIG. 1 depicts an exemplary embodiment of a parcel receiving system 20. The parcel receiving system 20 depicted by FIG. 1 comprises a parcel monitoring system 22 at a materials handling facility 24, such as a warehouse, distribution center, cross-docking facility, order fulfillment center (also referred to as a fulfillment facility), packaging facility, shipping facility, or other facility for performing one or more functions of material (inventory) handling. The parcel monitoring system 22 has a conveyor system 23 and an imaging tunnel 25, which will be described in more detail below. Parcels delivered to the materials handling facility 24 are passed through the imaging tunnel 25, and information about the parcels passing through the imaging tunnel 25 is captured by the parcel monitoring system 22.

In the embodiment depicted by FIG. 1, information captured by the parcel monitoring system 22 is uploaded to a server 26 via a network 29. The network 29 comprises any of various types of communication networks, such as the Internet, intranets, wide area networks (WANs), local area network (LANs), wireless networks, other suitable networks, or any combination of two or more such networks. A client 27 is interfaced with the network 29 and accesses the information stored at the server 26 via the network 29. The client 27 analyzes such information and, if desired, displays at least some of the information to a user. In some embodiments, the parcel monitoring system 22 and the client 27 are co-located (e.g., at the materials handling facility 24) and may share resources (e.g., have software running on the same computer). In other embodiments, such as shown by FIG. 1, the client 27 is located remotely from the parcel monitoring system 22 and communicates via the network 29.

FIGS. 2 and 3 depict an exemplary embodiment of the imaging tunnel 25 of FIG. 1. The imaging tunnel 25 comprises a housing 41 having an opening 43 for an entrance on one side of the housing 41 and an opening 44 for an exit on an opposite side of the housing 41. The openings 43 and 44 mark ends of a passageway 46 that extends through the housing 41. In the exemplary embodiment shown by FIGS. 2 and 3, the conveyor system 23 has a conveyor belt 48 that is moved in the x-direction by a motor (not shown) of the conveyor system 23. The conveyor belt 48 extends through the passageway 46 such that shipment parcels 49 positioned on the conveyor belt 48 move through the passageway 46 in the x-direction as the conveyor belt 48 moves in such direction. A shipment parcel 49 may comprise a box or other type of package for shipping at least one item.

The exemplary conveyor system 23 described above has a movable conveyor belt 48 on which parcels 49 are situated in order to move the parcels 49 through the materials handling facility 24. In other embodiments, other types of conveyor systems 23 are possible. For example, the conveyor system 23 may comprise chutes that guide the parcels 49 as they are moving. Such a conveyor system 23 may be gravity-fed such that a conveyor system motor is not required or may utilize a conveyor belt 48 or other type of track similar to the conveyor system 23 depicted by FIGS. 2 and 3. In yet other embodiments, other types of conveyor systems 23 are possible.

FIG. 4 depicts an exemplary embodiment of the parcel monitoring system 22. The parcel monitoring system 22 comprises parcel monitoring logic 52 that generally controls the operation and functionality of the parcel monitoring system 22. The parcel monitoring logic 52 can be implemented in software, firmware, hardware, or any combination thereof. In the exemplary embodiment illustrated in FIG. 4, the parcel monitoring logic 52 is implemented in software and stored in memory 55 of the parcel monitoring system 22.

The exemplary embodiment of the parcel monitoring system 22 depicted by FIG. 4 comprises at least one conventional processing element 57, such as a digital signal processor (DSP) or a central processing unit (CPU), that communicates to and drives the other elements within the parcel monitoring system 22 via an interface 59, which can include conductive connections (e.g., buses), wireless channels, and/or networks, such as a local area network (LAN). If a portion of the parcel monitoring logic 52 is implemented in software, the processing element 57 fetches and executes instructions of the parcel monitoring logic 52 according to known techniques.

The parcel monitoring logic 52 is configured to maintain data 60, referred to hereafter as "parcel data," indicative of the parcels 49 handled by the parcel monitoring system 22. In this regard, the parcel monitoring logic 52 assigns each parcel 49 a unique identifier, referred to hereafter as the "parcel's identifier" or "parcel identifier," and stores this identifier into memory 55 as part of the parcel data 60. As will be described in more detail hereafter, various types of information indicative of the parcel 49 are stored in memory 55 and correlated with the parcel identifier. Various techniques may be used to correlate an identifier assigned to a parcel 49 and the information that is indicative of the parcel 49. For example, the parcel monitoring logic 52 may define various entries in the memory 55 and may store within each entry the identifier of a parcel 49 and the information pertaining to the identified parcel 49. Thus, the information within the same entry is correlated with the parcel identifier stored in the same entry. In other embodiments, other types of techniques can be used to correlate a parcel identifier with the information pertaining to the identified parcel 49.

In one exemplary embodiment, the assigned parcel identifier is read directly from the parcel 49. For example, the parcel monitoring system 22 may be configured to read a purchase order (PO) number, a shipping number, or other type of character string attached to the parcel 49 and use such string as the parcel's identifier. Alternatively, the parcel monitoring logic 52 may randomly generate or otherwise provide different identifiers for different parcels 49.

The identifier assigned to a parcel 49 is preferably attached to such parcel 49 in order to assist users in distinguishing between parcels 49. If the identifier is read from the parcel 49, then the parcel 49 already has the identifier attached to it without any further action by the parcel monitoring system 22. However, if the identifier assigned to a parcel 49 is not attached to the parcel 49, then an identifier dispenser 61 is configured to attach the identifier to the parcel 49. In this regard, the parcel monitoring logic 52 transmits data defining the parcel identifier to the dispenser 61, which prints the identifier on a label 62 (FIG. 3) having an adhesive on one side. The dispenser 61 then positions the label 62 such that the side with the adhesive contacts the parcel 49 binding the label 62 to the parcel 49, as shown by FIG. 3.

Referring to FIG. 4, the parcel monitoring system 22 also comprises a communication interface 63, such as a modem, for enabling the parcel monitoring system 22 to communicate with the network 29 (FIG. 1). In one exemplary embodiment, the communication interface 63 communicates data via Internet Protocol (IP), but other types of communication protocols are possible in other embodiments.

The parcel monitoring system 22 comprises a weight sensor 66 for measuring the weight of the parcels 49 passing through the imaging tunnel 25. In one exemplary embodiment, the weight sensor 66 is positioned under the conveyor belt 48 so that, as a parcel 49 is moved by the conveyor belt 48 over the weight sensor 66, the weight sensor 66 automatically senses the weight of the parcel 49. For each weighed parcel 49, the weight sensor 66 transmits data indicative of the parcel's weight to the parcel monitoring logic 52, which updates the parcel data 60 based on the indicated weight. In this regard, the parcel monitoring logic 52 updates the parcel data 60 to include data indicative of the measured weight and correlates such parcel data 60 with the identifier assigned to the parcel 49 by the parcel monitoring logic 52.

In addition, the parcel monitoring system 22 comprises at least one sensor 71 for sensing at least one parameter pertaining to a parcel 49 being handled by the parcel monitoring system 22. For example, the sensor 71 may be configured to sense a size or a position of the parcel 49. Various types and numbers of sensors 71 may be employed to sense various parcel parameters. In one exemplary embodiment, the sensors 71 are mounted on the housing 41 and positioned in an interior of the housing 41. However, the sensors 71 can be mounted and/or positioned differently in other embodiments.

In one exemplary embodiment, the sensors 71 comprise a plurality of infrared sensors (not specifically shown) positioned at various locations around a parcel 49 as it is moving through the imaging tunnel 25. Each such sensor 71 has an infrared transmitter (not specifically shown) and receiver (not specifically shown). The transmitter emits infrared radiation that is detected by the receiver. In one embodiment, the radiation reflects from a surface of the parcel 49 and the time of travel from the transmitter to the receiver indicates the parcel's distance from the sensor 71. The information sensed by the sensors 71 is transmitted to the parcel monitoring logic 52, which can be configured to use such information for a variety of purposes.

For example, in at least one embodiment, the parcel monitoring logic 52 uses the information from the sensors 71 (e.g., the parcel's distance from multiple sensors 71) to determine the parcel's dimensions. In another example, the logic 52 uses such information to determine the parcel's position relative to the conveyor belt 48 or other component of the parcel monitoring system 22. Exemplary techniques for using the information from the sensors 71 will be described in more detail below. The information from the sensors 71 and/or information derived from the sensors 71, such as parcel size or position, is stored in memory 55 as part of the parcel data 60. The information pertaining to a particular parcel 49 is correlated with the identifier assigned to the parcel 49 by the parcel monitoring logic 52.

As shown by FIG. 4, the parcel monitoring system 22 comprises at least one camera 72 that is configured to capture digital images of parcels 49 passing through the imaging tunnel 25. In one exemplary embodiment, the camera 72 is mounted on the housing 41 and is located interior to the housing 41. Further, the camera 72 captures an image of a parcel 49 while the parcel 49 is passing through the housing 41, which shields the parcel 49 from at least some ambient light at the time of image capture. By shielding the parcel 49 from ambient light, the parcel monitoring system 22 can better control the lighting characteristics for the parcel 49 at the time of image capture, helping to improve the quality of the images captured by the camera 72. Data 77, referred to hereafter as "image data," defining the captured image is stored in memory 55 and correlated with the parcel identifier assigned to the imaged parcel 49. Thus, using a parcel's identifier, the images of the identified parcel 49 stored in memory 55 can be automatically located and retrieved.

In one exemplary embodiment, a light source 75 is mounted on the housing 41 and located interior to the housing 41. The light source 75 produces light, which illuminates the parcel 49 at the time of image capture.

Note that characteristics of the light source 75, such as position relative to the parcel 49 and/or brightness, and of the camera 72, such as position relative to the parcel 49 and/or lens focusing, can be automatically selected and controlled in an effort to provide a high quality image of the parcel 49. Further, in the embodiment shown by FIG. 4, the camera 72 and the light source 75 are respectively coupled to motors 82 and 85, which move the camera 72 and light source 75.

In this regard, the parcel monitoring logic 52, for a parcel 49 passing through the imaging tunnel 25, is configured to control the motor 82 in order to change a characteristic of the camera 72 based on some parameter, such as a size of the parcel 49 or a position of the parcel 49 on the conveyor belt 48. For example, in at least one embodiment, the parcel monitoring logic 52 is configured to control the motor 82 such that the camera 72 is a particular distance from the parcel 49 at the time of image capture. As a mere example, the parcel monitoring logic 52, is configured to position the camera 72 based on information from the sensors 71, such that the camera 72 is a predefined distance from the parcel 49 at the time of image capture. Alternatively, the parcel monitoring logic 52 may dynamically select the camera's position from the parcel 49 depending on the size of the parcel 49 or some other parameter. Further, in one exemplary embodiment, the parcel monitoring logic 52 is configured to use the motor 82 to control the focus of the camera 72 at the time of image capture based on some parameter, such as a size or position of the parcel 49.

Similarly, the parcel monitoring logic 52, for a parcel 49 passing through the imaging tunnel 25, is configured to control the motor 85 in order to change a characteristic of the light source 75 based on some parameter, such as a size of the parcel 49 or a position of the parcel 49 on the conveyor belt 48. For example, in at least one embodiment, the parcel monitoring logic 52 is configured to control the motor 85 such that the light source 75 is a particular distance from the parcel 49 at the time of image capture. As a mere example, the parcel monitoring logic 52 is configured to position the light source 75 based on information from the sensors 71, such that the light source 75 is a predefined distance from the parcel 49 at the time of image capture. Alternatively, the parcel monitoring logic 52 may dynamically select the light source's position from the parcel 49 depending on the size of the parcel 49 or some other parameter. Further, in one exemplary embodiment, the parcel monitoring logic 52 is configured to control the brightness of the light source 75 at the time of image capture based on some parameter, such as a size or position of the parcel 49.

As a mere example, assume that it is desirable for the light source 75 to be positioned 3.0 inches from a parcel 49 at the time of image capture and for the camera 72 to be position 2.0 inches from a parcel 49 at the time of capture. Further assume that, based on the sensors 71, the parcel monitoring logic 52 determines that, at the time of image capture, the parcel 49 will be located 3.5 inches from the light source 75 and 2.5 inches from the camera 72. In such an example, the parcel monitoring logic 52 is configured to control the motors 82 and 85 to move the light source 75 and camera 72 such that they are respectively positioned 3.0 and 2.0 inches from the parcel 49 at the time of image capture. Various other techniques for controlling the characteristics of the camera 72 and/or the light source 75 based on the sensors 71 are possible in other embodiments.

As shown by FIG. 4, the parcel monitoring system 22 also comprises a curtain actuator 86, an X-ray system 87, a sonar system 88, and a radio frequency (RF) identification system 89. The curtain actuator 86 will be described in more detail hereafter. The X-ray system 87 is configured to capture an X-ray image of the parcel 49 within the housing 41. In one exemplary embodiment, multiple X-ray images from different perspectives are captured. The parcel monitoring logic 52 is configured to analyze the captured X-ray images and to count the number of items (e.g., products) within the parcel 49 based on such X-ray images. The parcel monitoring logic 52 stores the count as part of the parcel data 60, and the parcel monitoring logic 52 stores the X-ray images as part of the image data 77. As an example, the X-ray images may be used to prove to a vendor that a parcel 49, upon arriving at the materials handling facility 24, did not contain the correct number of items. The item count and the X-ray images are correlated with the identifier assigned to the parcel 49 by the parcel monitoring logic 52. When the imaging tunnel 25 has an X-ray system 87, as described above, the housing 41 may be composed of a material, such as concrete or lead, that tends to block or absorb electromagnetic radiation in order to protect users within a close proximity of the imaging tunnel 25.

The sonar system 88 is configured to emit sonar signals that reflect from the parcel 49 and are detected by the sonar system 88. Based on the reflected signals, the sonar system 88 determines the dimensions of the parcel 49, and the parcel monitoring logic 52 is configured to store values indicative of such dimensions as part of the parcel data 60. In this regard, the parcel monitoring logic 52 correlates the dimension values with the identifier assigned to the parcel 49 by the parcel monitoring logic 52. As described herein, in some embodiments, the dimensions may be determined via other techniques, such as by analyzing the images captured by the camera 72.

In one exemplary embodiment, a vendor or shipper of a parcel 49 couples an RF circuit, such as an RF integrated circuit (IC) chip, to the parcel 49 before it is received at the materials handling facility 24. Data pertaining to the parcel 49, such as product, order, shipping numbers, other types of identifiers, or information about the items contained in the parcel 49 (e.g., item count, item descriptions, item identifiers), is stored in the RF circuit, and the RF circuit wirelessly transmits such data via RF signals. To keep the power requirements of the RF circuit low, the range of the RF signals is limited (e.g., just a few feet).

The RF identification (ID) system 89 is configured to receive the RF signals transmitted by the parcel's RF circuit. The RF ID system 89 is further configured to recover the information carried by the RF signals and to provide such data to the parcel monitoring logic 52, which stores the information as part of the parcel data 60. In this regard, the parcel monitoring logic 52 correlates such information with the identifier assigned to the parcel 49 by the parcel monitoring logic 52.

As shown by FIG. 4, the parcel monitoring system 22 further comprises a scanner 93 configured to read certain information from a parcel 49 being handled by the parcel monitoring system 22. For example, the vendor or shipper may attach bar codes for conveying certain information, such as product, order, or shipping numbers or other types of identifiers, and the scanner 93 is configured to read such information. Data indicative of the read information is transmitted to the parcel monitoring logic 52, which stores such information in memory 55 as part of the parcel data 60. In this regard, the parcel monitoring logic 52 correlates the information read from a parcel 49 with the identifier assigned to the parcel 49 by the parcel monitoring logic 52.

Note that any of the components of the parcel monitoring system 22 that communicate with the parcel monitoring logic 52 may be conductively coupled to the interface 59. Alternatively, any such components may be configured to communicate wireless signals such that a physical connection is unnecessary. For example, the scanner 93 may be a hand-held device configured to communicate wirelessly. Similarly, the camera 72 may be a hand-held device configured to communicate wirelessly. In one exemplary embodiment, the scanner 93 and camera 72 are combined as a single hand-held device that wirelessly communicates with the parcel monitoring logic 52. Further, one or more networks, such as a LAN or WAN, may be used by any of the components of the parcel monitoring system 22 to communicate with the parcel monitoring logic 52.

Purchase order (PO) data 125 is stored in memory 55 of the parcel monitoring system 22. The PO data 125 includes information regarding the purchase orders that have been sent to vendors. For example, for each such order, the PO data 125 may indicate the quantity and type of items that have been ordered, the order date, and/or the expected shipment or delivery date. The PO data 125 may also indicate the approximate size and/or weight of the expected parcel 49 for fulfilling the purchase order. Other types of information about a purchase order may be indicated by the PO data 125.

The parcel monitoring logic 52 is configured to analyze the parcel data 60 and/or image data 77 in an effort to capture various information and detect exceptions. For example, in at least one embodiment, the parcel monitoring logic 52 is configured to capture PO information, such as a PO number, or other shipment parameters (e.g., parcel dimensions, parcel weight, item count, item descriptions, shipping numbers, vendor identifiers, and other information pertaining to the shipped parcel) from a PO label 127 (FIG. 2) and to store such information in memory 55 as part of the parcel data 60. The PO information can be received via scanner 93. However, some PO labels 127 may have PO information that is not readable via scanner 93. If PO information is not received from scanner 93, then the parcel monitoring logic 52 is configured to search the image data 77 in an effort to locate the desired PO information.

As an example, assume that the PO number for a particular parcel 49 is not received from the scanner 93, and the parcel monitoring logic 52 searches the parcel's image data 77 for the PO number. In this regard, the parcel monitoring logic 52 attempts to locate a bar code or alpha-numeric characters within the images defined by the image data 77 correlated in memory 55 with the parcel's identifier. The parcel monitoring logic 52 may employ known optical character recognition (OCR) algorithms in an attempt to locate and read PO information from the images.

In another example, the parcel monitoring logic 52 discovers a vendor identifier for the vendor that shipped the parcel 49. Such a vendor identifier may be located on the PO label 127 and discovered via scanner 93 or by analyzing the image data 77 similar to the techniques described above for discovering the PO number. In addition, the vendor identifier may be included in the PO data 125, and parcel monitoring logic 52 may discover the vendor identifier from the PO data 125 once the entry in such PO data 125 correlated with the parcel 49 has been located. Further, the vendor identifier, if read from the parcel 49, may be helpful in locating the appropriate entry in the PO data 125 particularly if the PO number on the parcel 49 cannot be located or can be only partially read.

In some embodiments, the parcel monitoring logic 52 is configured to compare a located character string to the predefined PO data 125 stored in memory 55. If the located character string matches one of the PO numbers indicated by the PO data 125, then the parcel monitoring logic 52 identifies the located character string as being a PO number.

If the parcel monitoring logic 52 is able to locate the PO number in the image data 77, then the parcel monitoring logic 52 stores such number in the parcel data 60. However, if the parcel monitoring logic 52 is unable to find the PO number, then the parcel monitoring logic 52 detects an exception. In response to such a detection, the parcel monitoring logic 52 updates exception data 131 stored in memory 55 in order to log the exception occurrence. Handling of exceptions will be described further below.

If the parcel's PO number is found and if such PO number matches a PO number in the PO data 125, then the parcel monitoring logic 52 retrieves from the PO data 125 other PO information correlated with the matched PO number. For example, the retrieved PO information may indicate the expected size or weight range for the parcel 49. The logic 52 then compares this retrieved information to information sensed by the parcel monitoring system 22 in an effort to detect an exception. For example, in one embodiment, the parcel monitoring logic 52 compares the parcel's weight sensed by the weight sensor 66 to the expected weight range indicated for the parcel 49 by the PO data 125. If the sensed weight falls outside of the expected weight range, then it is likely that the vendor sent the wrong item or the wrong number of items for the PO. Thus, the parcel monitoring logic 52 detects an exception if the sensed weight is outside of the expected weight range.

In another example, the parcel monitoring logic 52 compares at least one dimension (e.g., length, width, or height) of the parcel 49, as measured by at least one sensor 71, to an expected range for the dimension indicated by the PO data 125 for the parcel 49. If the measured dimension is outside of the expected range, then it is likely that the vendor sent the wrong item or the wrong number of items for the PO. Thus, the parcel monitoring logic 52 detects an exception if the measured dimension is outside of the expected range.

It is possible for the measured dimension to be derived from the image data 77 rather than the sensors 71. In this regard, it is possible for the parcel monitoring logic 52 to employ known edge detection techniques to locate edges of the parcel 49. If the distance of the parcel 49 from the camera 72 is known, then the parcel monitoring logic 52 can calculate the actual distance from one parcel edge to another. Other techniques for determining a dimension of the parcel 49 based on the image data 77 are possible in other embodiments.

Note that other types of exceptions can be automatically detected by the parcel monitoring logic 52 in other examples. For example, if a side of the parcel 49 is crushed or otherwise deformed during delivery, then by analyzing the image data 77 or data from the sensors 71, the parcel monitoring logic 52 may detect such deformation and log an exception in response.

As described above, when an exception is detected, the parcel monitoring logic 52 logs the exception in the exception data 131. In particular, the parcel monitoring logic 52 stores information about the exception in the exception data 131. For example, the parcel monitoring logic 52 may store the time of the exception occurrence and information regarding the type of exception detected. In this regard, exception types are coded, and the parcel monitoring logic 52 stores the code for the detected exception in the exception data 131. As an example, the exception code for a missing PO number may be "12." In such an example, when the parcel monitoring logic 52 is logging an exception in response to a determination that the PO number cannot be located, the parcel monitoring logic 52 stores the code value "12" in the exception data 131. Thus, the exception data 131 can be analyzed to determine not only the number and times of exception occurrences but also the types of exceptions that occurred.

For each exception, the parcel monitoring logic 52 also stores information from parcel data 60. For example, data indicative of the parcel's size or weight may be included in the exception data 131 for the detected exception. If the vendor's identifier is known (e.g., received from scanner 93, determined by analyzing the image data 77 or PO data 125, or otherwise discovered by the parcel monitoring logic 52), then such identifier is included in the exception data 131. If the PO number for the parcel 49 is discovered, then the PO number is included in the exception data 131. Various other types of information about the parcel 49 to which the exception pertains may be stored in the exception data 131. Accordingly, by maintaining the exception data 131, the parcel monitoring logic 52 effectively tracks exceptions. As will be described in more detail below, such exception data 131 can be analyzed to discover various statistics and information about the exceptions detected by the parcel monitoring system 22.

Upon detecting an exception, the parcel monitoring logic 52 calls or otherwise activates exception handling logic 142 for handling and attempting to resolve the exception. The exception handling logic 142 may be implemented in hardware, firmware, software, or any combination thereof. In one exemplary embodiment, as depicted by FIG. 4, the exception handling logic 142 is implemented in software and stored in memory 55 of the parcel monitoring system 22 although the exception handling logic 142 may be stored remotely from the parcel monitoring logic 52, if desired.

Figure 5:
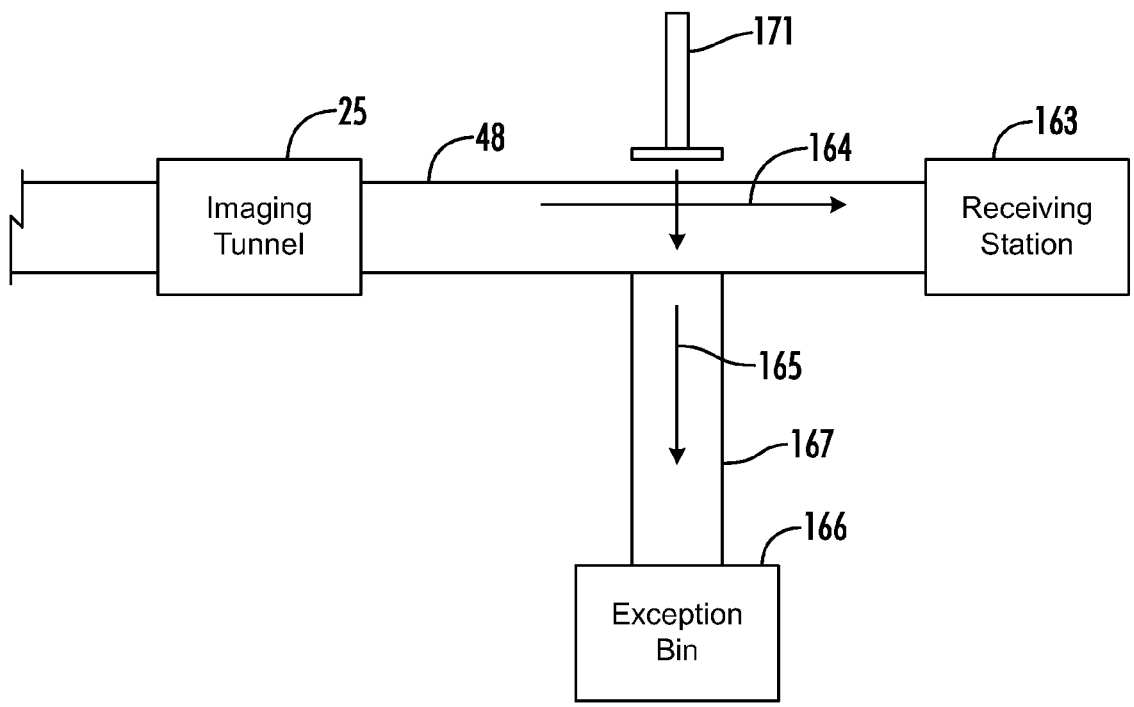
FIG. 5 is a diagram illustrating an exemplary flow of a shipment parcel through a materials handling facility, such as is depicted by FIG. 1.

In general, if the parcel monitoring logic 52 does not detect an exception or if the exception handling logic 142 is able to timely resolve the exception, then the parcel 49 passes through the imaging tunnel 25 and to a receiving station 163, as shown by FIG. 5. In this regard, the conveyor belt 48 defines a parcel path 164, referred to hereafter as the "receiving path," that takes the parcels 49 traveling along the receiving path 164 to the receiving station 163. At the receiving station 163, the parcel 49 is opened, and the parcel's items are received, unpacked, and processed for storage at the materials handling facility 24 (FIG. 1). However, if the parcel monitoring logic 52 detects an exception that is not timely resolved by the exception handling logic 142 or otherwise, then the parcel 49 is diverted from the receiving path 164 to a path 165, referred to hereafter as the "exception path," that takes the parcels 49 traveling along the exception path 165 to an exception bin 166. In the embodiment depicted by FIG. 5, a conveyor belt 167 carries parcels 49 along the exception path 165.

In this regard, as shown by FIGS. 4 and 5, the conveyor system 23 has an actuator 171, such as a movable arm, that is activated by the parcel monitoring logic 52 when the parcel monitoring logic 52 detects an exception that is not resolved by the time the parcel 49 reaches the actuator 171. When activated, the actuator 171 pushes or otherwise forces the parcel 49 associated with the unresolved exception to the exception path 165, which takes the parcel 49 to the exception bin 166 instead of the receiving station 163. Once a parcel 49 reaches the exception bin 166, the parcel 49 generally remains at the exception bin 166 until a user is able to manually investigate the exception. In general, it is desirable to reduce the number of parcels 49 diverted to the exception bin 166 in order to reduce transaction costs related to personnel having to manually investigate and handle exceptions of parcels 49 diverted to such exception bin 166.

There are various techniques that can be employed to resolve exceptions detected by the parcel monitoring logic 52. Some exceptions may be automatically resolved by the exception handling logic 142. In some cases, data collected by the parcel monitoring system 22, such as parcel data 60 or image data 77, may be conveyed to a vendor of the parcel 49 or other user to enable the vendor or other user to help resolve the exception. Exemplary techniques for resolving exceptions are described in commonly-assigned U.S. patent application Ser. No. 12/241,475, which is incorporated herein by reference.

Figure 6:
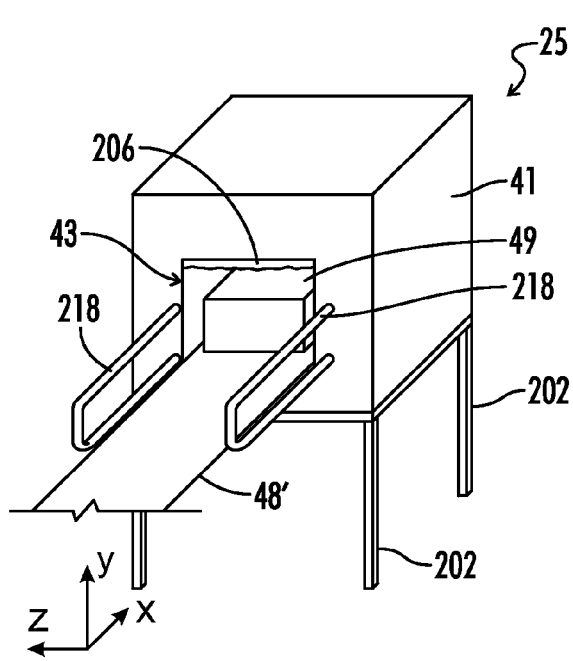
FIG. 6 is a diagram illustrating an exemplary embodiment of an imaging tunnel, such as is depicted in FIG. 1.

FIG. 6 depicts an exemplary embodiment of the imaging tunnel 25. As shown by FIG. 6, the imaging tunnel 25 comprises a housing 41 that has an opening 43 for an entrance and an opening (not shown in FIG. 6) for an exit similar to the housing 41 shown above in FIGS. 2 and 3. In FIG. 6, the housing 41 rests on a base 202 that has legs extending to a floor. In other embodiments, the housing 41 may rest on the floor or another type of base or object. In one exemplary embodiment, the housing 41 is composed of porous concrete and has a length of about 2 meters in the x, y, and z directions, but other materials and dimensions are possible in other embodiments.

Figure 7:
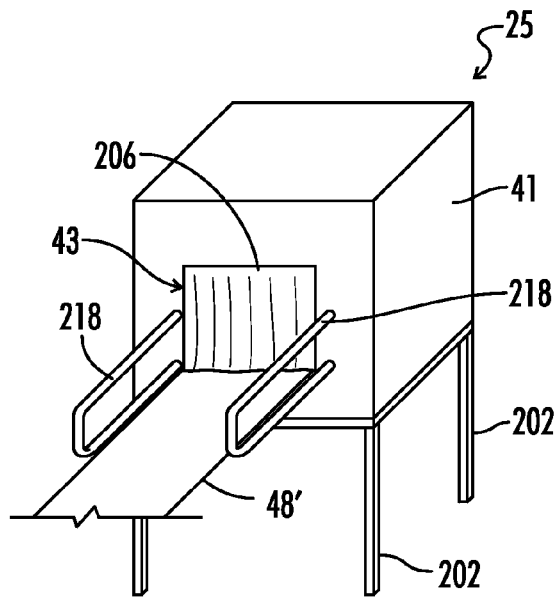
FIG. 7 is a diagram illustrating the imaging tunnel of FIG. 6 after a curtain at an entrance of the imaging tunnel has been moved to a closed position.

In the embodiment shown by FIG. 6, the housing 41 has a curtain 206 at its opening 43. In FIG. 6, the curtain 206 is shown in an open position such that a parcel 49 on a conveyor belt 48' can pass through the opening 43 without interference from the curtain 206. Once the parcel 49 is inside of the housing 41, as indicated by a sensor 71 (FIG. 4) or other component, the curtain actuator 86 (FIG. 4) moves the curtain 206 to a closed position, as shown by FIG. 7, such that the opening 43 is covered by the curtain 206.

Figure 8:
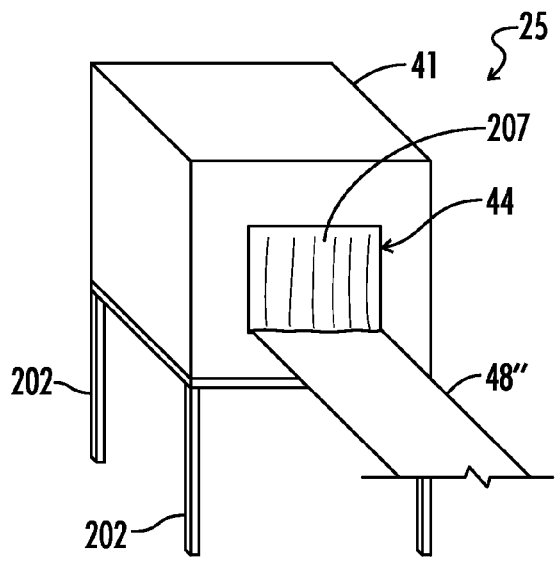
FIG. 8 is a diagram illustrating another perspective of the imaging tunnel of FIG. 6.

As shown by FIG. 8, the imaging tunnel's opening 44 is covered by a curtain 207. While the parcel 49 is in the imaging tunnel 25, the curtain 207 is in the closed position, as shown by FIG. 8. Thus, while the parcel 49 is in the imaging tunnel 25, both of the openings 43 and 44 are covered by curtains 206 and 207, respectively. Covering of the openings 43 and 44 helps to shield the components within the imaging tunnel 25 from ambient noise and light. As previously described above, the housing 41 shields its interior components, including the parcel 49 being analyzed, from ambient noise (e.g., RF energy) and light, thereby helping to improve the accuracy and/or quality of the captured data and/or images. In one exemplary embodiment, the housing 41 completely encloses its interior components and the parcel 49 being analyzed except for the openings 43 and 44, and such openings 43 and 44 are covered by curtains 206 and 207 while a parcel 49 is in the imaging tunnel 25.

Figure 9:
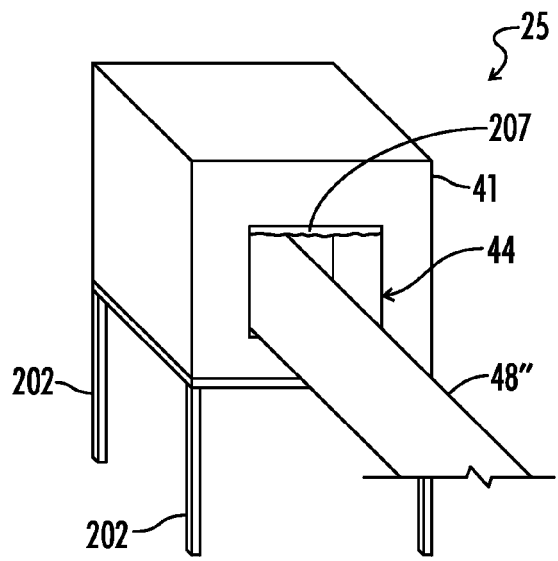
FIG. 9 is a diagram illustrating the imaging tunnel of FIG. 8 after a curtain at an exit of the imaging tunnel has been moved to an open position.

Once the parcel monitoring logic 52 has collected data pertaining to a parcel 49 and the parcel 49 is about to exit the housing 41, a curtain actuator 86 (FIG. 4) moves the curtain 207 to an open position, as shown by FIG. 9, to allow the parcel 49 to exit the housing 41 through the opening 44 without interference from the curtain 207.

Note that movement of a curtain 206 or 207 by a curtain actuator 86 is unnecessary. For example, a parcel 49 may pass into and out of the housing 41 without the curtains 206 and 207 being moved by a curtain actuator 86. In such an example, the parcel 49 may contact a curtain 206 or 207 and continue moving such that the curtain 206 or 207 slides over the parcel 49. If desired, a curtain 206 or 207 may be cut (vertically or otherwise) to allow the parcel 49 to slip between portions of the curtain 206 or 207 in order to facilitate movement of the parcel 49 past the curtain 206 or 207. In other embodiments, the imaging tunnel 25 may be implemented without curtains 206 and 207 such that the openings 43 and 44 are uncovered while a parcel 49 is in the housing 41.

Figure 10:
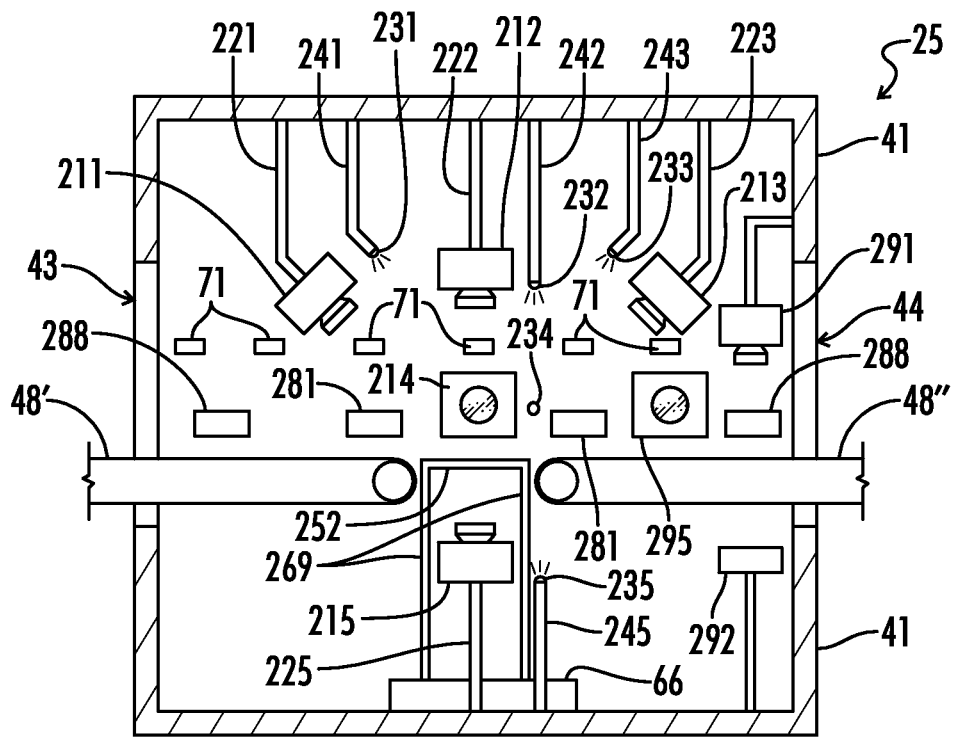
FIG. 10 is a cross-sectional view of an imaging tunnel, such as is depicted by FIG. 6.
Figure 11:
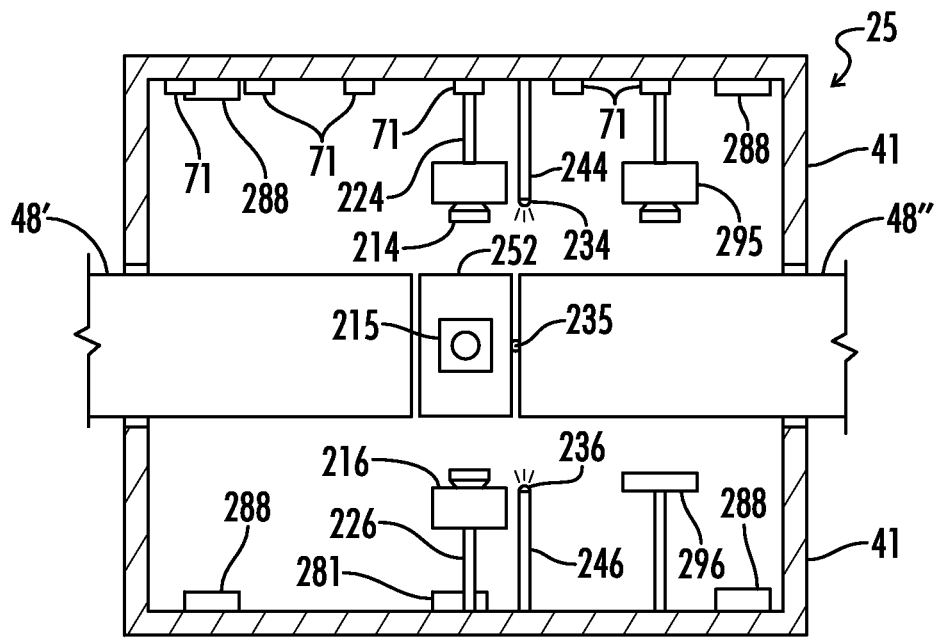
FIG. 11 is a cross-sectional view of the imaging tunnel depicted by FIG. 10.

In one exemplary embodiment, six cameras 211-216 are mounted within the housing 41, as shown by FIGS. 10 and 11. Each camera 211-216 captures an image of a respective side of the parcel 49. Thus, an image of each side of a six-sided parcel 49 can be captured by the cameras 211-216. In particular, the camera 211 captures an image of a side of the parcel 49 facing the opening 43, and the camera 213 captures an image of a side of the parcel 49 facing the opening 44. Further, the camera 214 captures an image of a side of the parcel 49 facing a wall of the housing 41, and the camera 216 captures an image of the opposite side of the parcel 49 relative to the side imaged by the camera 214. In addition, the camera 212 captures an image of a side of the parcel 49 facing the ceiling of the housing 41, and the camera 215 captures an image of a side of the parcel 49 facing the conveyor belt 48'.

Figure 12:
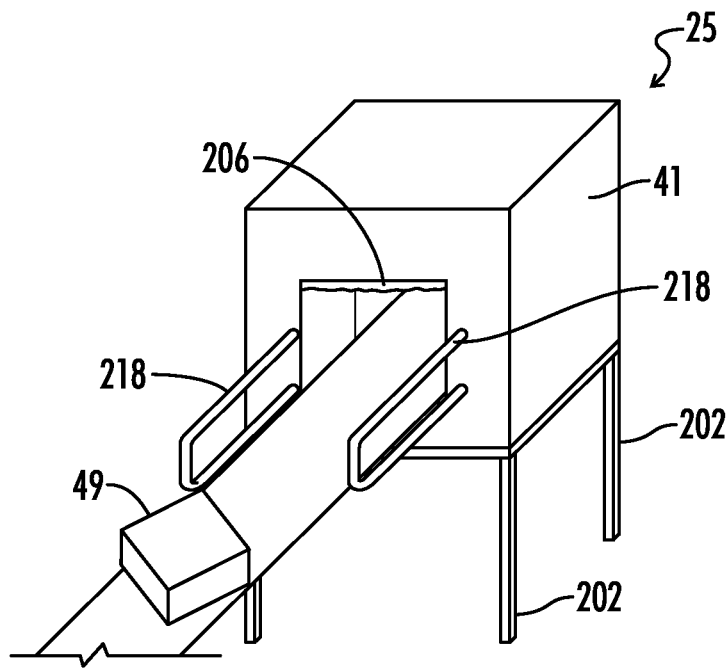
FIG. 12 is a diagram of the imaging tunnel of FIG. 6 before a parcel reaches guide rails of the imaging tunnel.

As shown by FIG. 6, guide rails 218 extend from a side of the housing 41. The guide rails 218 are positioned such that a parcel 49 contacts at least one rail 218 if the parcel 49 is oriented such that there is not at least one side of the parcel 49 substantially perpendicular to the direction of motion (i.e., the x-direction). For example, assume that a parcel 49 is oriented as shown by FIG. 12. As the parcel 49 travels toward the imaging tunnel 25, the parcel 49 contacts the guide rails 218, and the relative movement between the parcel 49 and the guide rails 218 creates a force that pushes the parcel 49 into an orientation such that a side of the parcel 49 is substantially perpendicular to the x-direction, as shown by FIG. 6. In this regard, the guide rails 218 guide the parcel 49 into an orientation such that a side of the parcel 49 directly faces the opening 43. Thus, the cameras 211-216 can be fixedly positioned within the housing 41 such that each side of a parcel 49 is directly and fully exposed to at least one camera 211-216 assuming that at least one side of the parcel 49 is substantially perpendicular to the x-direction. It is also possible for the orientation of the parcel 49 to be sensed by components, such as sensors 71 or sonar system 88 (FIG. 4), and for the cameras 211-216 to be automatically moved under the control of the parcel monitoring logic 52 such that an image of each side of the parcel 49 is captured by at least one camera 211-216 regardless of the parcel's orientation.

In the embodiment depicted by FIGS. 10 and 11, each camera 211-216 is mounted on a respective arm 221-226 that extends from the housing 41. In one embodiment, the position of each camera 211-216 is fixed. In another embodiment, the arms 221-226 are movable such that the positions of any of the cameras 211-216 can be changed under the direction and control of the parcel monitoring logic 52. For example, each of the arms 221-226 may be a robotic arm capable of moving and/or rotating in any direction.

In one exemplary embodiment, the parcel monitoring logic 52 controls the camera positions based on the sensed position of the parcel 49. As an example, the camera 211 may be positioned such that it is out of the path of movement of the parcel 49. Once the parcel 49 passes the camera 211, the parcel monitoring logic 52 may move the camera 211 directly behind the parcel 49 in order to capture the side of the parcel 49 facing the opening 43. In addition, the parcel monitoring logic 52 may move cameras 211-216 based on parcel size. For example, the parcel monitoring logic 52 may move the cameras 211-216 closer to smaller parcels 49 relative to the positions of the cameras 211-216 for larger parcels 49. Various other techniques and algorithms for moving the cameras 211-216 are possible in other embodiments.

In addition to six cameras 211-216, the imaging tunnel 25 of FIGS. 10 and 11 has six light sources 231-236 for illuminating the parcel 49 that is within the housing 41. Each light source 231-236 comprises at least one device, such as a light emitting diode (LED), for emitting light. In addition, each light source 231-236 is mounted on a respective arm 241-246 that extends from the housing 41. Each light source 231-236 is positioned to directly illuminate a respective side of the parcel 49. In this regard, the six light sources 231-236 can be used to illuminate each side of a six-sided parcel 49.

In one embodiment, the position of each light source 231-236 is fixed. In another embodiment, the arms 241-246 are movable such that the positions of any of the light sources 231-236 can be changed under the direction and control of the parcel monitoring logic 52. For example, each of the arms 241-246 may be a robotic arm capable of moving and/or rotating in any direction.

The parcel monitoring logic 52 is configured to control the brightness of each light source 231-236. As an example, a plurality of sensors 71 may be configured to sense the position of the parcel 49 as it travels through the housing 41, and the parcel monitoring logic 52 may adjust the brightness and/or positions of any of the light sources 231-236 based on the parcel's current position. In another example, the parcel monitoring logic 52 may control a light source 231-236 such that it flashes or, in other words, emits light at a high brightness when one of the cameras 211-216 is capturing an image. Various other techniques for controlling the light sources 231-236 are possible in other examples.

As shown by FIGS. 10 and 11, a transparent path segment 252 is positioned between two conveyor belts 48' and 48", which respectively extend through the openings 43 and 44 of the housing 41. When a parcel 49 enters the housing 41 on the conveyor belt 48', the parcel 49 travels toward the path segment 252, and the momentum of the parcel 49 moves the parcel 49 onto the path segment 252. In one embodiment, the path segment 252 is composed of Plexiglas or glass, but other transparent materials for the path segment 252 are possible in other embodiments. While the parcel 49 is on the path segment 252, the camera 215 captures at least one image of the parcel 49 through the transparent path segment 252.

In one embodiment, the momentum of the parcel 49 as it moves off of the belt 48' and onto the path segment 252 is sufficient to enable the parcel 49 to reach the conveyor belt 48". Once the parcel 49 reaches the conveyor belt 48", the conveyor belt 48" carries the parcel 49 out of the housing 41 through the opening 44. However, in other embodiments, the parcel 49 stops on the path segment 252. For example, in an effort to improve the quality of the images captured by the cameras 211-216, the parcel monitoring logic 52 may control the cameras 211-216 such that each camera 211-216 captures an image of the parcel 49 after the parcel 49 has stopped on the path segment 252. Once the images have been captured, the parcel 49 may be moved onto the conveyor belt 48".

Figure 13:
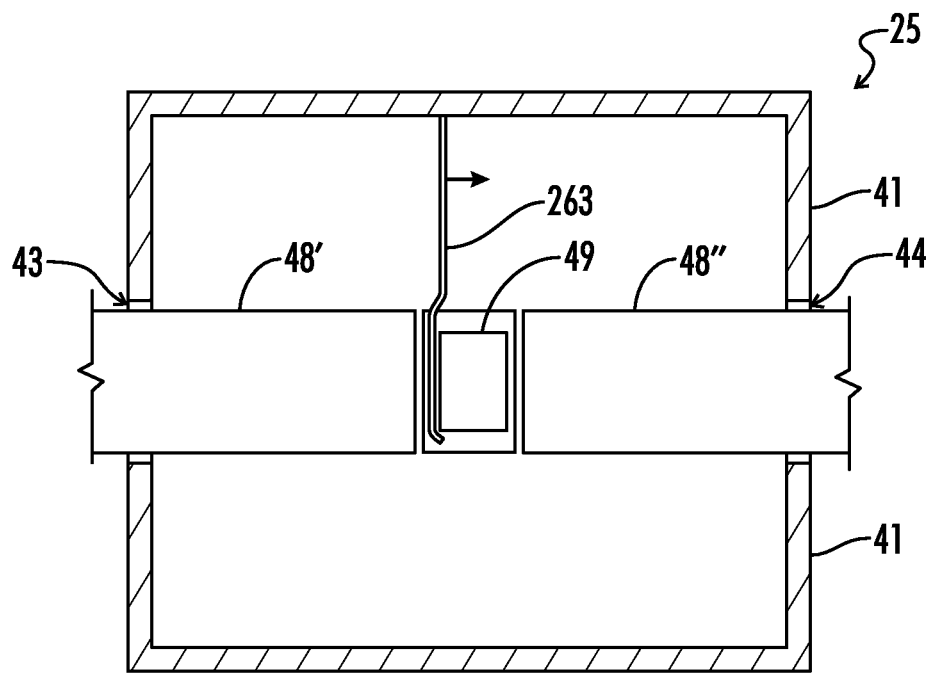
FIG. 13 is a cross-sectional view of an imaging tunnel, such as is depicted by FIG. 6, for an embodiment in which a movable arm moves a parcel from a path segment.

As an example, FIG. 13 depicts an exemplary embodiment in which a movable arm 263 operating under the direction and control of the parcel monitoring logic 52 pushes the parcel 49 from the path segment 252 to the conveyor belt 48". The parcel monitoring logic 52 may control the arm 263 such that the arm 263 contacts and pushes the parcel 49 after the cameras 211-216 have captured images of the parcel 49.

Figure 14:
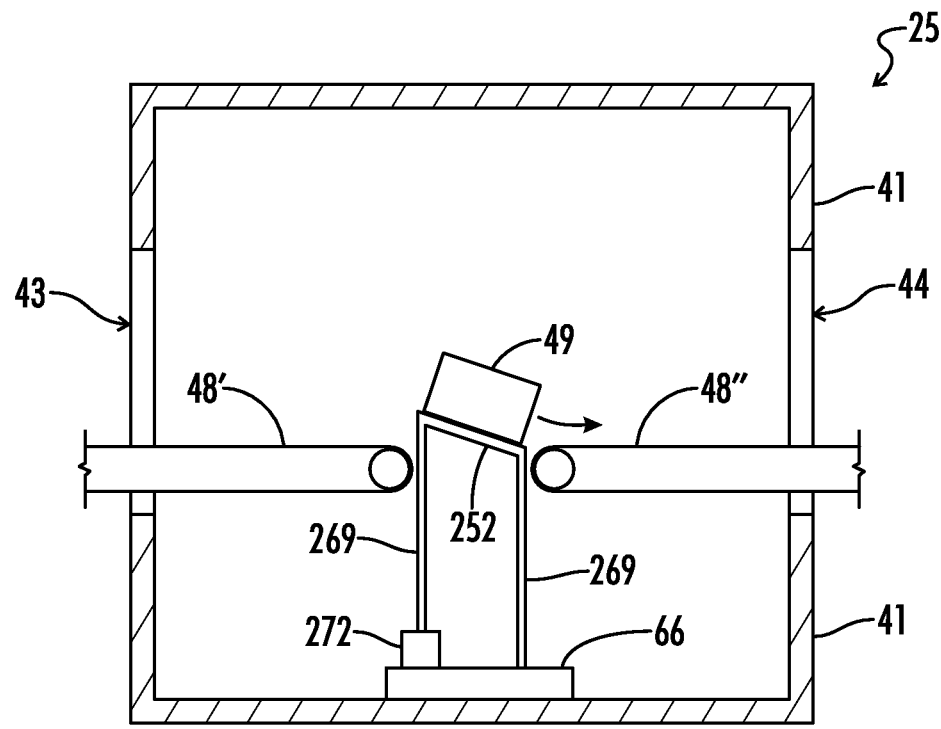
FIG. 14 is a cross-sectional view of an imaging tunnel, such as is depicted by FIG. 6, for an embodiment in which a path segment is tilted in order to move a parcel from the path segment.

FIG. 14 depicts an embodiment in which the path segment 252 is tilted so that gravity causes the parcel 49 to slide off of the path segment 252 and onto the conveyor belt 48". In this regard, the path segment 252 has a plurality of legs 269. At least one of the legs 269 is coupled to a motor 272 operating under the direction and control of the parcel monitoring logic 52. Once the cameras 211-216 have captured images of the parcel 49, the parcel monitoring logic 52 activates the motor 272 such that it raises at least one leg 269 of the path segment 252 thereby tilting the path segment 252, as shown by FIG. 14. Gravity then pulls the parcel 49 onto the conveyor belt 48", which carries the parcel 49 through the housing opening 44.

Figure 15:
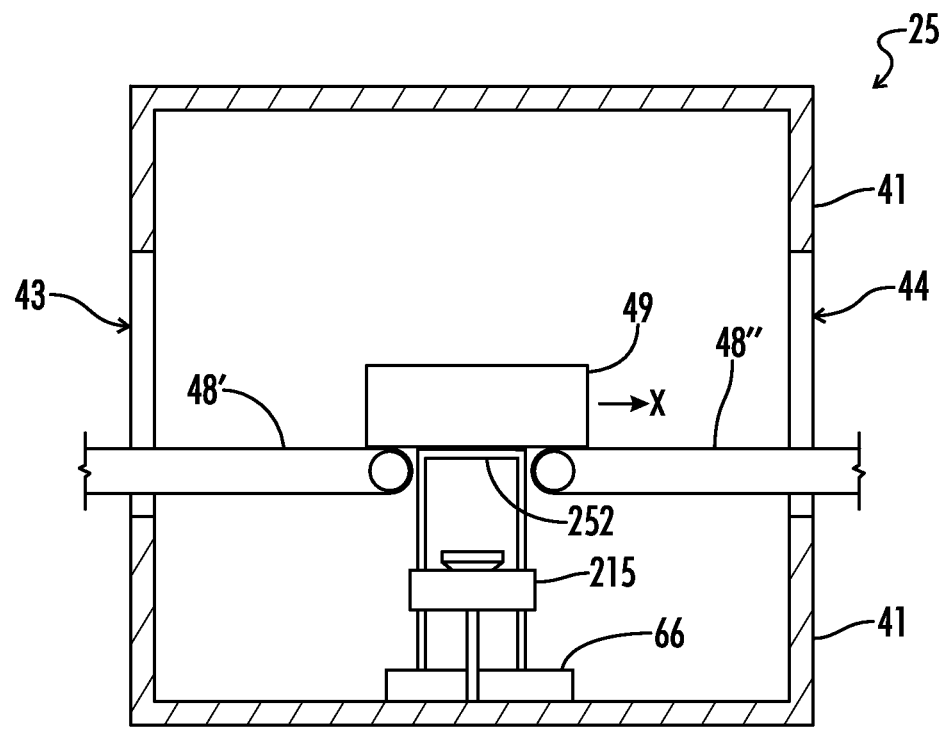
FIG. 15 is a cross-sectional view of an imaging tunnel, such as is depicted by FIG. 6.

FIG. 15 depicts an embodiment in which a length of the parcel 49 in the x-direction is greater than a length of the path segment 252 and also the distance from conveyor belt 48' to conveyor belt 48". In such an embodiment, the parcel 49 reaches conveyor belt 48" before leaving the conveyor belt 48' and, therefore, continuously moves over the path segment 252, assuming that both conveyor belts 48' and 48" are continuously moving. In the instant embodiment, the imaging tunnel 25 may be implemented without the path segment 252.

In the embodiment depicted by FIG. 15, the camera 215 is configured to capture multiple images of the parcel 49 as it is passing over the path segment 252. Each of the images is not a full image of the bottom of the parcel 49 since at least some of the parcel's bottom side is occluded by at least one of conveyor belts 48', 48" for each image. The parcel monitoring logic 52 is configured to combine portions of the multiple images to generate a composite image depicting the full bottom side of the parcel 49. Conventional image stitching techniques may be employed by the parcel monitoring logic 52 in generating the composite image. The parcel monitoring logic 52 is configured to store the composite image as part of the image data 77 and to correlate the composite image with the identifier assigned to the parcel 49 by the parcel monitoring logic 52.

In other embodiments, other techniques for moving a parcel 49 over a gap between conveyor belts 48', 48" are possible. Further, it is possible to capture images of all sides of a parcel 49 without moving the parcel 49 over such a gap. For example, a robotic arm (not shown) may be configured to change the orientation of a parcel 49 as it is traveling through the housing 41.

As shown by FIGS. 10 and 11, sonar transceivers 281 are mounted on the interior walls of the housing 41. Each sonar transceiver 281 emits and detects sonar waves. As described above, using data from the sonar transceivers 281, the parcel monitoring logic 52 can determine information pertaining to the parcel 49 passing through the housing 41. For example, the parcel monitoring logic 52 can use sonar to determine the orientation and/or the dimensions of the parcel 49. Further, it is possible for the parcel monitoring logic 52 to use three-dimensional (3D) sonar to count items within the parcel 49.

In addition, RF ID receivers 288 are mounted on the interior walls of the housing 41. The RF ID receivers 288 receive any RF signals that may be emitted from an RF circuit coupled to the parcel 49 passing through the imaging tunnel 25. In this regard, for a parcel 49 equipped with such an RF circuit, the RF ID receivers 288 receive an RF tag from the RF circuit. The RF tag indicates various information about the parcel 49, such as the parcel's PO number, and the parcel monitoring logic 52 stores information from the RF tag as part of the parcel data 60 (FIG. 4).

As shown by FIG. 10, an X-ray emitter 291 is mounted on an interior wall of the housing 41, and an X-ray receiver 292 receives electromagnetic radiation emitted by the X-ray emitter 291. The X-ray receiver 292 has photographic material that is altered by electromagnetic radiation that passes through the parcel 49 from the X-ray emitter 291. In this regard, the parcel monitoring logic 52 monitors the position of the parcel 49 based on the sensors 71 or otherwise, and activates the X-ray emitter 291 when the parcel 49 is between the X-ray emitter 291 and X-ray receiver 292. The X-ray receiver 292 is configured to convert an X-ray image on the photographic material into a digital image and to transmit the digital image to the parcel monitoring logic 52, which stores the digital image as part of the image data 77.

In addition, another X-ray emitter 295 is mounted on an interior wall of the housing 41, as shown by FIGS. 10 and 11, and electromagnetic radiation emitted by the X-ray emitter 295 is received by an X-ray receiver 296. In this regard, the parcel monitoring logic 52 monitors the position of the parcel 49 based on the sensors 71 or otherwise, and activates the X-ray emitter 295 when the parcel 49 is between the X-ray emitter 295 and X-ray receiver 296. The X-ray receiver 296 has photographic material that is altered by electromagnetic radiation from the X-ray emitter 295. The X-ray receiver 296 is configured to convert an X-ray image on the photographic material into a digital image and to transmit the digital image to the parcel monitoring logic 52, which stores the digital image as part of the image data 77.

In one exemplary embodiment, the direction of travel of the radiation from the X-ray emitter 291 is orthogonal to the direction of travel of the radiation from the X-ray emitter 295. Thus, analysis of the X-ray images from the X-ray receivers 292, 296 can reveal the number of items within the parcel 49 even if items are stacked on top of each other. For example, the X-ray image from the X-ray receiver 292 may reveal the number of columns of items within the parcel 49, and the X-ray image from the X-ray receiver 296 may reveal the number of rows within each column. In one exemplary embodiment, the parcel monitoring logic 52 is configured to count the number of items in the parcel 49 based on the digital X-ray images and to store the item count within the parcel data 60. Such item count can be used to detect an exception. For example, the parcel monitoring logic 52 may be configured to detect an exception in response to a determination that the number of items counted based on the X-ray images is different than the number of expected items indicated for the parcel 49 by the PO data 125 (FIG. 4).

As shown by FIG. 10, the legs 269 of the path segment 252 are coupled to a weight sensor 66. When the parcel 49 is moved onto the path segment 252, the weight sensor 66 senses a weight of the parcel 49 and transmits a value indicative of the sensed weight to the parcel monitoring logic 52, which stores the value as a part of the parcel data 60. Further, the weight value can be used to detect an exception. For example, the parcel monitoring logic 52 may be configured to detect an exception in response to a determination that the weight sensed by the weight sensor 66 is different than the expected weight indicated for the parcel 49 by the PO data 125 (FIG. 4). Note that other positions for the weight sensor 66 are possible in other embodiments. For example, the weight sensor 66 may be positioned underneath a conveyor belt 48' or 48" such that it senses the weight of the parcel 49 while the parcel 49 is on the conveyor belt 48' or 48".

It should be emphasized that any of the components of the parcel monitoring system 22 shown by FIG. 4 may reside external to the imaging tunnel 25, if desired. For example, the scanner 93 may scan information from a parcel 49 before the parcel 49 enters the imaging tunnel 25 or after the parcel 49 leaves the imaging tunnel 25. In addition, the weight sensor 66 may sense the weight of the parcel 49 before the parcel 49 enters the imaging tunnel 25 or after the parcel 49 leaves the imaging tunnel 25. Other information collected by the parcel monitoring system 22 may be sensed or otherwise determined before the parcel 49 enters the imaging tunnel 25 or after the parcel 49 leaves the imaging tunnel 25.

In addition, the number of components shown in FIGS. 10 and 11 are exemplary. For example, in the embodiment shown by FIGS. 10 and 11, six cameras 211-216 and six light sources 231-236 are employed, but other numbers of cameras and light sources may be used in other embodiments. Similarly, the number of other components, such as RF ID receivers 288, X-ray emitters 291, 295, X-ray receivers 292, 296, and sonar transceivers 281, may also be varied.

An exemplary operation and use of the parcel monitoring system 22 will be described below with particular reference to FIG. 16, which depicts a flowchart that provides one example of the operation of the parcel monitoring system 22. Alternatively, the flowchart of FIG. 16 may be viewed as depicting steps of an example of a method implemented in the parcel monitoring system 22. The order of the blocks shown by FIG. 16 may be rearranged such that the blocks are performed in other sequences, if desired.

Assume that the PO data 125 (FIG. 4) indicates that a particular parcel 49 containing four items is expected. The PO data 125 indicates a unique PO number for the parcel 49, and the PO data 125 indicates the parcel's expected weight and dimensions. Once the parcel 49 arrives at the materials handling facility 24, the parcel 49 is placed on a conveyor belt 48' that moves the parcel to the imaging tunnel 25. Once the parcel 49 enters the housing 41, the sensors 71 detect a presence of the parcel 49. In response to such detection, the parcel monitoring logic 52 controls the parcel monitoring system 22 such that parcel data 60 and image data 77 are captured for the parcel 49, as shown by blocks 321 and 325 of FIG. 16.

In this regard, the parcel monitoring logic 52 determines the PO number for the parcel 49, the weight of the parcel 49, the number of items of contained by the parcel 49, and the dimensions of the parcel 49. Such information, referred to hereafter as "parcel information," may be determined via a variety of techniques. For example, at least some the parcel information may be communicated via RF signals, which are transmitted from an RF circuit coupled to the parcel 49 and received by at least one of the RF ID receivers 288. In addition, the parcel monitoring logic 52 may control the cameras 211-216 such that images of the parcel 49 are captured by the cameras 211-216. The parcel monitoring logic 52 may analyze such images to find an image of the PO label 127. The parcel monitoring logic 52 may then use OCR or other image analysis techniques to discover at least some of the parcel information from the image of the PO label 127.

The parcel monitoring logic 52 may also control the X-ray emitters 291 and 295, as well as the X-ray receivers 292 and 296, such that X-ray images of the parcel 49 are captured. The parcel monitoring logic 52 may analyze such X-ray images to determine the number of items contained by the parcel 49. Additionally, the parcel monitoring logic 52 may determine the dimensions of the parcel 49 based on the sonar transceivers 281, and the parcel monitoring logic 52 may determine the weight of the parcel 49 based on the weight sensor 66.

As shown by block 328, the parcel monitoring logic 52 stores the captured parcel information in memory 55 as parcel data 60, and the parcel monitoring logic 52 stores the images captured by the cameras 211-216 and the captured X-ray images in memory 55 as image data 77. The stored parcel data 60 and image data 77 can be later used to resolve exceptions, if any.

As shown by block 333, the parcel monitoring logic 52 compares the PO data 125 with the parcel data 60 captured from the parcel 49 in an effort to detect exceptions. For example, the parcel monitoring logic 52 compares the parcel's PO number indicated by the parcel data 60 (e.g., the PO number received by the RF ID receivers 288 or read from the PO label 127) to the PO numbers indicated by the PO data 125. If there is no match, the parcel monitoring logic 52 detects an exception.

The parcel monitoring logic 52 also compares the parcel's expected weight to the parcel's actual weight indicated by the parcel data 60 (e.g., the weight sensed by the weight sensor 66, received by the RF ID receivers 288, or read from the PO label 127). If the expected weight and the actual weight do not match within an acceptable margin of error, then the parcel monitoring logic 52 detects an exception.

The parcel monitoring logic 52 also compares the parcel's expected item count to the parcel's actual item count indicated by the parcel data 60 (e.g., the item count received by the RF ID receivers 288, read from the PO label 127, or determined by the parcel monitoring logic 52 based on the X-ray images). If the expected item count and the actual item do not match, then the parcel monitoring logic 52 detects an exception.

The parcel monitoring logic 52 also compares the parcel's expected dimensions to the parcel's actual dimensions indicated by the parcel data 60 (e.g., the dimensions sensed by the sensors 71, sensed by the sonar transceivers 281, received by the RF ID receivers 288, or read from the PO label 127). If the expected dimensions and the actual dimensions do not match within an acceptable margin of error, then the parcel monitoring logic 52 detects an exception.

In other examples, various other types of exceptions may be detected by the parcel monitoring logic 52.

Figure 16:
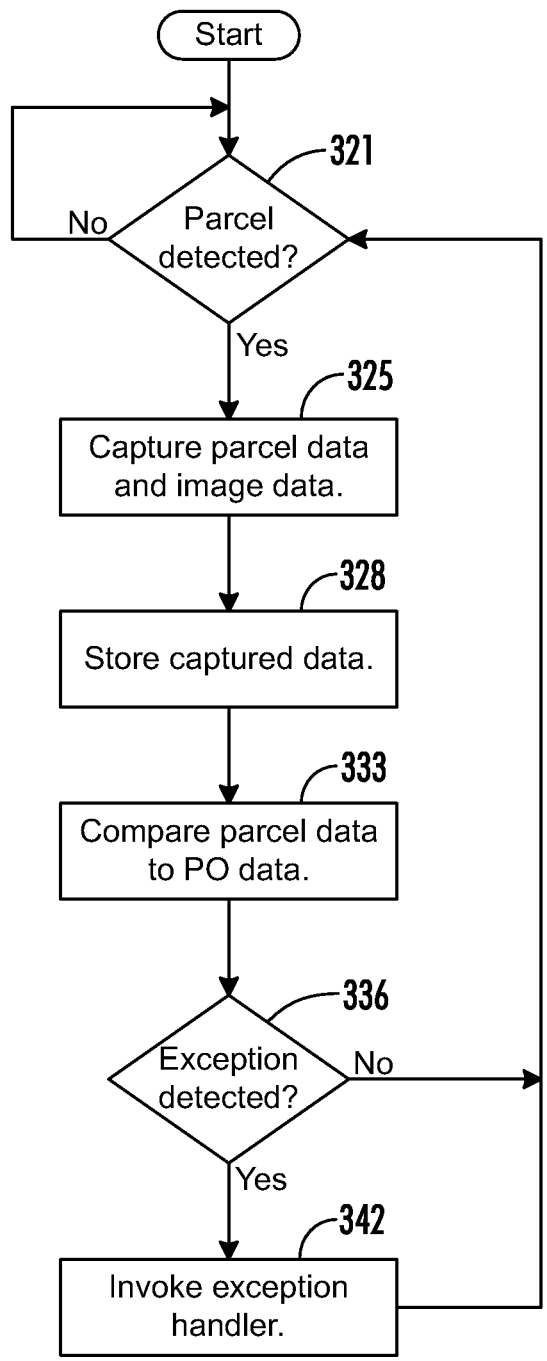
FIG. 16 is a flow chart illustrating an exemplary method of receiving a shipment parcel in a materials handing facility, such as is depicted in FIG. 1.

If the parcel monitoring logic 52 detects an exception, then the parcel monitoring logic 52 invokes the exception handling logic 142 to handle the exception, as shown by blocks 336 and 342 of FIG. 16. When invoked to handle an exception, the exception handling logic 142 attempts to resolve the exception. Commonly-assigned U.S. patent application Ser. No. 12/241,475, which is incorporated herein by reference, describes exemplary techniques that may be employed to resolve or otherwise handle an exception.

If no exception is detected for a parcel 49 or if any exception detected for the parcel is resolved before the parcel 49 reaches the actuator 171 (FIG. 5), then the actuator 171 is controlled such that the parcel 49 is allowed to proceed to the receiving station 163. However, if an exception is detected and not resolved before the parcel 49 reaches the actuator 171, then the exception handling logic 142 controls the actuator 171 such that the parcel 49 is diverted to the exception bin 166. Attempts to resolve the exception may continue after such diversion.

Accordingly, by implementing the techniques described above, the parcel monitoring system 22 (FIG. 1) automatically detects an exception and captures data that can be used to resolve the exception. The parcel monitoring system 22 also provides a record of the exception, including images of the parcel 49 at the time of reception at the materials handling facility 24 (FIG. 1), and the record can be later used to show that the exception is the fault of the vendor, not the personnel or equipment of the materials handling facility 24.

A number of software components are stored in the memory 55 (FIG. 4) and are executable by processing element 57 (FIG. 4). In this respect, the term "executable" means a program file that is in a form that can ultimately be run by a processing element 57. Examples of executable programs may be, for example, a compiled program that can be translated into machine code in a format that can be loaded into a random access portion of the memory 55 and run by the processing element 57, or source code that may be expressed in proper format such as object code that is capable of being loaded into a of random access portion of the memory 55 and executed by the processing element 57. An executable program may be stored in any portion or component of the memory 55 including, for example, random access memory, read-only memory, a hard drive, compact disk (CD), floppy disk, or other memory components.

The memory 55 is defined herein as both volatile and nonvolatile memory and data storage components. Volatile components are those that do not retain data values upon loss of power. Nonvolatile components are those that retain data upon a loss of power. Thus, the memory 55 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A parcel monitoring system, comprising:
a tunnel;
a conveyor belt extending through the tunnel, the conveyor belt operable to move a shipment parcel into the tunnel;
a transparent path segment positioned such that the shipment parcel is moved from the conveyor belt to the transparent path segment;
a sensor configured to sense the shipment parcel as the conveyor belt is moving the shipment parcel;
a camera positioned to capture an image of the shipment parcel through the transparent path segment; and
logic configured to control the camera based on the sensor such that the camera captures the image of the shipment parcel through the transparent path segment while the shipment parcel is in the tunnel and on the transparent path segment, the logic configured to store the image and to correlate the image with an identifier for the shipment parcel, the logic configured to analyze the image to determine a shipment parameter indicated by a label attached to the shipment parcel, the logic further configured to automatically detect an exception for the shipment parcel based on the shipment parameter, the exception indicating at least one of a shipment parcel defect or a shipment parameter defect.

2. The parcel monitoring system of claim 1, wherein the shipment parameter is a purchase order number for the shipment parcel.

3. A parcel monitoring system, comprising:
a tunnel;
a conveyor system configured to move a shipment parcel through the tunnel;
a sensor configured to sense the shipment parcel;
a camera; and
logic configured to control the camera based on the sensor such that the camera captures an image of the shipment parcel while the shipment parcel is in the tunnel, the logic further configured to correlate the image with an identifier for the shipment parcel, wherein the logic is configured to analyze the image and to detect a shipment error for the shipment parcel based on the image, and the shipment error causes a diversion of the shipment parcel from a current path to an exception path.

4. The parcel monitoring system of claim 3, wherein the conveyor system is configured to move the shipment parcel along the current path, the current path having a transparent path segment, wherein the camera is positioned to capture the image through the transparent path segment.

5. The parcel monitoring system of claim 3, wherein the logic is configured to move the camera with respect to the conveyor system based on the sensor.

6. The parcel monitoring system of claim 3, further comprising a light source positioned such that light from the light source illuminates the shipment parcel when the image of the shipment parcel is captured by the camera, wherein the logic is configured to control the light source.

7. The parcel monitoring system of claim 3, further comprising a plurality of cameras, wherein the logic is configured to control the plurality of cameras such that the camera and the plurality of cameras capture a respective image of each side of the shipment parcel.

8. The parcel monitoring system of claim 3, wherein the conveyor system comprises a first conveyor belt extending into the tunnel, a second conveyor belt extending into the tunnel, and a transparent path segment between the first and second conveyor belts, and wherein the camera is positioned to capture the image through the transparent path segment.

9. The parcel monitoring system of claim 3, further comprising:
a curtain coupled to the tunnel; and
a curtain actuator configured to move the curtain based on a position of the shipment parcel.

10. The parcel monitoring system of claim 3, further comprising a sonar transceiver configured to sense the shipment parcel while the shipment parcel is in the tunnel.

11. The parcel monitoring system of claim 3, further comprising a receiver coupled to the tunnel, the receiver configured to receive a wireless signal from the shipment parcel.

12. The parcel monitoring system of claim 3, wherein the current path is a receiving path.

13. The parcel monitoring system of claim 3, further comprising an X-ray system configured to capture an X-ray image of the shipment parcel while the shipment parcel is in the tunnel, wherein the logic is configured to correlate the X-ray image with the identifier.

14. The parcel monitoring system of claim 13, wherein the logic is configured count a number of items contained by the shipment parcel based on the X-ray image.

15. The parcel monitoring system of claim 3, wherein the logic, based on the image, is configured to determine a shipment parameter indicated by a label attached to the shipment parcel.

16. The parcel monitoring system of claim 15, wherein the parameter is a purchase order number for the shipment parcel.

17. A parcel monitoring system, comprising:
a conveyor system;
a sensor configured to sense a shipment parcel as the conveyor system is moving the shipment parcel;
a camera; and
logic configured to control the camera based on the sensor such that the camera captures an image of the shipment parcel, the logic configured to analyze the image to determine a shipment parameter indicated by a label attached to the shipment parcel, the logic further configured to automatically detect a defect for the shipment parcel based on the shipment parameter.

18. The parcel monitoring system of claim 17, further comprising a tunnel, wherein the conveyor system is configured to move the shipment parcel through the tunnel, and wherein the logic is configured to control the camera such that the camera captures the image of the shipment parcel while the shipment parcel is in the tunnel.

19. A parcel monitoring method, comprising the steps of:
moving a shipment parcel through a tunnel;
sensing the shipment parcel;
automatically capturing an image of the shipment parcel while the shipment parcel is in the tunnel based on the sensing step;
storing the image;
automatically correlating the image with an identifier for the shipment parcel;
automatically analyzing the image; and
automatically detecting a shipment error for the shipment parcel based on the analyzing step, the shipment error causing a diversion of the shipment parcel away from a predefined path.

20. The method of claim 19, further comprising the step of moving the camera with respect to the conveyor system based on the sensing step.

21. The method of claim 19, wherein the moving step comprises the step of moving the shipment parcel onto a transparent path segment, wherein the capturing step comprises the step of capturing the image of the shipment parcel through the transparent path segment.

22. The method of claim 19, further comprising the step of capturing an X-ray image of the shipment parcel while the shipment parcel is in the tunnel.

23. The method of claim 19, further comprising the steps of:
automatically determining a number of items contained in the shipment parcel; and
automatically detecting the shipment error for the shipment parcel based on the number.

24. The method of claim 19, further comprising the step of sensing the shipment parcel via sonar while the shipment parcel is in the tunnel.

25. The method of claim 19, further comprising the step of receiving a wireless signal transmitted from the shipment parcel while the shipment parcel is in the tunnel.

* * * * *

UNITED STATES PATENT AND TRADEMARK OFFICE
CERTIFICATE OF CORRECTION

PATENT NO. : 8,489,232 B2
APPLICATION NO. : 12/329927
DATED : July 16, 2013
INVENTOR(S) : Mishra et al.

Page 1 of 1

It is certified that error appears in the above-identified patent and that said Letters Patent is hereby corrected as shown below:

In the Claims:

Column 19, line 26, insert the word --to-- before the word "count" to read as follows:

-- logic is configured to count a number of items contained by the --

Signed and Sealed this
Fifth Day of August, 2014

Michelle K. Lee
*Deputy Director of the United States Patent and Trademark Office*